United States Patent
Inoue (10) Patent No.: US 7,807,123 B2
(45) Date of Patent: Oct. 5, 2010

(54) METHOD OF MANUFACTURING SILICON CARBIDE

(75) Inventor: Katsuhiko Inoue, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 1068 days.

(21) Appl. No.: 11/336,811

(22) Filed: Jan. 23, 2006

(65) Prior Publication Data

US 2006/0171873 A1    Aug. 3, 2006

(30) Foreign Application Priority Data

Jan. 28, 2005    (JP)    ............................. 2005-021614

(51) Int. Cl.
    *C01B 31/36*    (2006.01)
(52) U.S. Cl. ...................... 423/345; 423/439
(58) Field of Classification Search .................. 423/345, 423/439
    See application file for complete search history.

(56) References Cited

U.S. PATENT DOCUMENTS 5,079,195 A * 1/1992 Chiang et al. .................. 501/92
5,168,014 A * 12/1992 Daimaru et al. ............. 428/627
5,234,674 A * 8/1993 Sommers .................... 423/345
2005/0079119 A1 4/2005 Kawakami et al. ....... 423/447.3

FOREIGN PATENT DOCUMENTS

JP    5-279007    10/1993
JP    7-157307    6/1995

* cited by examiner

*Primary Examiner*—Edward M Johnson
(74) *Attorney, Agent, or Firm*—Fitzpatrick, Cella, Harper & Scinto (57) ABSTRACT

A method of manufacturing silicon carbide including reacting, in a temperature range of 370 to 800° C., (A) one selected from the group consisting of an alloy containing at least an Si element and one or more kinds of transition metal elements, a mixture containing metal silicon powder and transition metal powder, and a mixture of metal silicon powder and a transition metal compound with (B) one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon. The manufacturing method can provide a sufficient conversion ratio from raw materials at low temperatures and powdery silicon carbide having a small particle size and small amounts of impurities.

15 Claims, 3 Drawing Sheets

METHOD OF MANUFACTURING SILICON CARBIDE

BACKGROUND OF THE INVENTION

1. Field of the Invention

The present invention relates to a method of manufacturing silicon carbide, and more specifically, to a method of manufacturing silicon carbide powder having a large surface area and small amounts of impurities by synthesis from inexpensive raw materials at low temperatures using a simple manufacturing apparatus.

2. Related Background Art

Silicon carbide is heat and acid resistant, strong, and hard. It can be used as thermal and mechanical functional structure materials for various crucibles, ceramic baking components, abrasion resistant sliding members, heat exchanger tubes, paper components, catalyst carriers, filters, waste incinerator lining materials, heating elements, abrasives, and the like. Further, a silicon carbide single crystal wafer is used in the fields of automobiles and power semiconductors because of its advantage of small power loss in addition to the above-described thermally, chemically, and mechanically stable properties), and a silicon carbide powder material is required as a raw material therefor.

Examples of a method of manufacturing a silicon carbide powder material include: a method involving mixing metal silicon powder and carbon powder and heating the mixture at 1,000 to 1,400° C., as described in "Method of Manufacturing Silicon Carbide Ceramics", edited by Shigeyuki Somiya and Kichizo Inomata, published by Uchida Rokakuho Pub., 1988 (direct reaction method); a method involving utilizing a reduction reaction by allowing coke to act on silicon dioxide powder at 1,500 to 1,900° C. (reduction carbonization method); a method involving thermally decomposing a compound, such as polycarbosilane, in a nonoxidative atmosphere at 1,300 to 2,000° C. (thermal decomposition method); and a chemical vapor deposition method involving reacting halogenated silicon, such as silicon tetrachloride, with methane at 800 to 2,000° C. (CVD method).

In the direct reaction method, silicon carbide powder to be obtained has a large particle size, and metal silicon tends to remain unreacted. Thus, the direct reaction method requires a long reaction time. Further, in the reduction carbonization method, a reaction temperature is high at 1,500° C. or higher. The reduction carbonization method requires a long reaction time for reacting sufficiently the raw materials of silicon dioxide and carbon. The reduction carbonization method stops if toxic carbon monoxide formed as a by-product is not removed, and thus has a problem in that a removal device and a detoxification device must be installed. The thermal decomposition method requires a reaction temperature of 1,300° C. or higher and is problematic from the viewpoint of a high process cost and the cost of the organic silicon compound for use as a raw material.

The CVD method employs halogenated silicon and methane as raw materials. Thus, the CVD method has problems of not only high raw Material cost, but also formation of toxic hydrogen halides as a by-product through decomposition of the raw materials to thereby damage an apparatus by corrosion. Further, the CVD method requires a reaction temperature of 800° C. at a minimum. A phenomenon of sublimation of an Si element component occurs more readily at higher temperatures in the temperature ranges used for the respective above-mentioned methods. Further, a high reaction temperature leads to a degrading yield problem and is a major factor in increasing the manufacturing cost.

Further, Japanese Patent Application Laid-Open No. H05-279007 discloses a method involving impregnating a cellulose material with water glass, neutralizing sodium silicate with an acidic substance, allowing the cellulose material to carry silica washed with water, baking in an inert atmosphere at 1,000 to 2,000° C., and pulverizing the baked product.

Regarding a method of manufacturing high purity β-silicon carbide powder that can be used for a silicon carbide single wafer, Japanese Patent Application Laid-Open No. H07-157307 discloses a method involving mixing an ethyl silicate monomer and a catalyst for accelerating curing of a resin, such as a phenol resin, carbonizing the mixture in a nitrogen atmosphere at 900° C., and baking the carbonized product in an argon atmosphere at 1,900° C.

However, a high temperature manufacturing apparatus used for each of the above-mentioned methods requiring a high reaction temperature of higher than 800° C. has problems of a longer time for heating and cooling at a higher reaction temperature and a higher running cost at longer reaction times.

Further, at such a high reaction temperature, a particle size of silicon carbide powder to be produced increases to thereby degrade the sintering properties. Thus, a pulverizing step is required for using the silicon carbide powder as a raw material for a sintered molded product. However, the silicon carbide powder is a hard material and has a problem in that impurity elements, such as metals, are mixed in the pulverizing step.

Thus, there is desired a technique of manufacturing a silicon carbide material having a small particle size applicable to various uses and small amounts of impurities at low cost. A small particle size can be adjusted through simple thermal treatment, and thus, a method of reducing a silicon carbide synthesis temperature is required.

SUMMARY OF THE INVENTION

The present invention has been made in view of the above-mentioned circumstances, and an object of the present invention is to provide a method of manufacturing powdery silicon carbide having a small particle size and small amounts of impurities at low cost by using a simple apparatus, obtaining a sufficient conversion ratio at a low temperature from raw materials, reducing the cost of the process, and using inexpensive raw materials without generating toxic hydrogen halides.

That is, a first aspect of the present invention provides a method of manufacturing powdery silicon carbide including reacting, at a temperature in a range of 370 to 800° C., an alloy containing at least an Si element and one or more kinds of transition metal elements with one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon.

A second aspect of the present invention provides a method of manufacturing powdery silicon carbide including reacting, at a temperature in a range of 370 to 800° C., a mixture containing at least metal silicon powder and transition metal powder with one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon.

A third aspect of the present invention provides a method of manufacturing powdery silicon carbide including reacting, at a temperature in a range of 370 to 800° C., a mixture containing at least metal silicon powder and a transition metal compound with one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon.

It is preferable that, in those aspects, the steps of reacting be performed at an absolute pressure in a range of 0.3 to 60.0 MPa.

A fourth aspect of the present invention provides a method of manufacturing powdery silicon carbide including reacting, at a supercritical state or a subcritical state, an alloy containing at least an Si element and one or more kinds of transition metal elements with one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon.

A fifth aspect of the present invention provides a method of manufacturing powdery silicon carbide including reacting, at a supercritical state or a subcritical state, a mixture containing at least metal silicon powder and transition metal powder with one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon.

A sixth aspect of the present invention provides a method of manufacturing powdery silicon carbide including reacting, under a supercritical state or a subcritical state, a mixture containing at least metal silicon powder and a transition metal compound with one or more kinds of substituted or unsubstituted hydrocarbons selected from the group consisting of a chain saturated hydrocarbon, a chain unsaturated hydrocarbon, a cyclic saturated hydrocarbon, an alcohol, and an aromatic hydrocarbon.

DESCRIPTION OF THE PREFERRED EMBODIMENTS

Hereinafter, the present invention will be described in more detail.

The present invention provides a method of manufacturing silicon carbide powder including reacting, at a temperature in a range of 370 to 800° C., an alloy or mixture containing at least a material containing an Si element and a material containing a transition metal element serving effectively as a catalyst for accelerating decomposition of a hydrocarbon, with a substituted or unsubstituted hydrocarbon (hereinafter, abbreviated as "hydrocarbon"), to thereby allow the manufacture of silicon carbide powder at a low temperature in the above-mentioned temperature range.

In the present invention, the raw materials react with each other at a lower temperature than in a conventional method, and the method of the present invention involves forming a C element by decomposing a hydrocarbon in the low temperature range and rapidly reacting the C element with an Si element in the raw material.

Thus, various conditions, such as a material containing an Si element, a material containing a transition metal element serving effectively as a catalyst for accelerating the decomposition of a hydrocarbon, a hydrocarbon material, an apparatus structure, and apparatus conditions must be selected appropriately. Hereinafter, embodiments of the present invention including preferred raw materials, preferred apparatus, preferred conditions, and the like will be described.

In the present invention, a chain saturated hydrocarbon for use as a raw material is preferably a mixture composed of one or more kinds of the raw materials selected from the group consisting of, for example, methane, ethane, propane, butane, pentane, hexane, heptane, octane, nonane, decane, undecane, dodecane, tridecane, tetradecane, pentadecane, hexadecane, heptadecane, octadecane, nonadecane, eicosane, isobutane, isopentane, dimethyl butane, trimethyl pentane, methyl octane, methyl heptane, and methyl pentane. Of those, pentane, hexane, heptane, octane, nonane, decane, undecane, dodecane, tridecane, tetradecane, pentadecane, hexadecane, heptadecane, octadecane, and nonadecane are preferable raw materials in terms of their ease of handling, because each one is in a liquid form or solid form. N-hexane is a preferable raw material in terms of its inexpensiveness.

Examples of a chain unsaturated hydrocarbon for use as the raw material include ethylene, propylene, butene, pentene, hexene, heptene, octene, nonene, decene, methyl propene, cyclohexene, cyclopentene, butadiene, propadiene, acetylene, and propyne. Examples of a more preferable chain unsaturated hydrocarbon include propylene, ethylene, and butadiene, because these hydrocarbons are inexpensive and are highly reactive with a silicon carbide powder.

Examples of a cyclic saturated hydrocarbon for use as a raw material include cyclopropane, cyclobutane, cyclopentane, cyclohexane, cycloheptane, cyclooctane, cyclononane, cyclodecane, methylcyclohexane, methylcyclopentane, dimethyl cyclopentane, and decalin.

Examples of an alcohol for use as the raw material include ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, isobutyl alcohol, t-butanol, methyl butanol, cyclohexanol, and allyl alcohol. Examples of a more preferable alcohol include ethanol and butanol, because these alcohols are inexpensive and are highly reactive with a silicon carbide powder.

Examples of an aromatic hydrocarbon for use as the raw material include benzene, toluene, xylene, ethylbenzene, propylbenzene, butylbenzene, styrene, phenol, aniline, benzoic acid, phthalic acid, acetylsalicylic acid, nitrobenzene, chlorobenzene, naphthalene, and anthracene. Of those, benzene, toluene, ethylbenzene, propylbenzene, butylbenzene, and styrene are more preferable because of their high reactivities.

In addition, a preferable material for use as the raw material of the silicon carbide powder is a liquefied natural gas including methane as a main component, ethane, propane, butane, nitrogen gas, carbon dioxide gas, and sulfur compounds or a liquefied petroleum gas of a mixture including propane, propylene, normal butane, isobutane, butylene, and isobutylene in terms of providing low cost.

Of the above-mentioned raw materials, the unsaturated hydrocarbon is most preferred from the viewpoint of high reactivity. The unsaturated hydrocarbon has a carbon double bond and its π electrons easily bond to a transition metal element in the catalyst. Thus, a dehydration reaction is more liable to occur, thereby presumably forming an active C element and further accelerating a reaction with an Si element. The raw material is preferably in a form of a liquid or a gas at normal temperatures and atmospheric pressure from the viewpoint of ease of handling and separation of a product from the unreacted raw materials.

Two or more kinds of hydrocarbons can be used in combination or the hydrocarbon can be used in combination with an aromatic compound.

The hydrocarbon preferably converts into a supercritical fluid or a subcritical fluid in a temperature range of 370 to 800° C. and an absolute pressure of 60 MPa or less. n-Hexane as an example of the saturated hydrocarbon has a critical temperature of 234.4° C. and a critical pressure of 2.97 MPa, and a state exceeding this critical point is a supercritical state. A fluid in a subcritical state is a fluid similar to the supercritical fluid. To be specific, the fluid in a subcritical state refers to a fluid not exceeding the supercritical point and having a temperature T (absolute temperature) and a pressure P (MPa) satisfying the following expressions, where the temperature (critical temperature) and pressure (critical pressure) at the above-mentioned critical point is represented by $T_0$ (absolute temperature) and $P_o$ (MPa), respectively.

$T \geq 0.8 T_0$ $P \geq 0.8 P_0$.

The supercritical fluid or the subcritical fluid can be formed by selecting amounts of raw materials to be introduced with respect to an inner volume of a reaction vessel and a heating temperature.

The hydrocarbon in a state of the supercritical fluid or subcritical fluid exists at a higher density in a vicinity of a catalyst than hydrocarbon raw material molecules in a gaseous state. In addition, a frictional force between hydrocarbon molecules is small, and the hydrocarbon molecules have a large diffusion coefficient. Thus, contact frequency between the catalyst and the hydrocarbon molecules increases to thereby accelerate a dehydration reaction.

The critical temperature and the critical pressure vary depending on the hydrocarbon. Ethylene, for example, has a critical temperature of 9.65° C. and a critical pressure of 5.076 MPa. Propylene has a critical temperature of 92° C. and a critical pressure of 4.62 MPa. Acetylene has a critical temperature of 35.33° C. and a critical pressure of 6.139 MPa. 1-Butanol has a critical temperature of 289.93° C. and a critical pressure of 4.413 MPa.

The heating temperature varies depending on a substance forming the supercritical fluid or the subcritical fluid, but is in a range of 370 to 800° C., and preferably 450 to 700° C. from the viewpoints of ease of reaction, reduction in the cost of the apparatus to be used, reduction in operational energy, and the like. The pressure is 60.0 MPa or less, preferably 0.3 to 60.0 MPa, and more preferably 2 to 30 MPa from the viewpoints of reactivity of the raw materials and structural material strength of the apparatus.

A medium for dissolving or dispersing the hydrocarbon or catalyst may be used for facilitating sealing of the raw materials, adjusting a total pressure, accelerating a main reaction including promotion of a catalytic action, and the like.

At least one medium selected from the group consisting of carbon dioxide, carbon monoxide, water, helium, argon, ether, nitrogen, hydrogen, nitrogen monoxide, hydrogen sulfide, and ammonia is preferred as the medium. The medium coexisting with the raw materials and the catalyst allows more uniform dispersion of the catalyst and the raw materials and promotion of a reaction of the raw materials. Thus, the medium is also preferably a substance forming a supercritical fluid or a subcritical fluid.

To be specific, helium, argon, and nitrogen each have poor reactivity and reduce the probability of a collision between the raw material molecules to prevent a side reaction and stabilize the decomposition reaction of a raw material gas. The medium as a supercritical fluid or a subcritical fluid has functions of reducing a frictional force between medium molecules and raw material molecules by reducing the frictional force between the medium molecules and facilitating motion of the raw material molecules. The medium provides the catalyst and the raw materials with a uniform reaction field to thereby accelerate a reaction of forming an active C element together with a decomposition reaction of the hydrocarbon. Thus, the medium is preferably capable of controlling the reactions by simply adjusting the total pressure.

Carbon monoxide, carbon dioxide, water, nitrogen monoxide, hydrogen, ether, hydrogen sulfide, and ammonia are each a preferred medium acting on hydrogen or carbon to be formed through decomposition of a hydrocarbon and capable of serving an important role in manufacturing the silicon carbide powder.

In particular, carbon dioxide as a medium accelerates the reaction of forming an active C element together with a decomposition reaction of the hydrocarbon. The reason is described below. First, carbon dioxide converts into a supercritical fluid or a subcritical fluid and the frictional force between the medium molecules is reduced such that the medium molecules collide with each other at higher speeds. Thus, the catalyst and the raw materials are brought into contact with each other uniformly. Next, carbon and hydrogen are generated in a hydrocarbon decomposition reaction. However, carbon and hydrogen just formed by the decomposition are still in the active state and recombine into the original hydrocarbon or into another hydrocarbon at a specific ratio. A degree of decomposition and recombination eventually reaches an equilibrium under specific temperature and pressure conditions. Carbon dioxide reacts with active hydrogen and removes active hydrogen to disturb the equilibrium, thereby easily forming an active C element. Alternatively, a large amount of carbon dioxide present in a reaction system, in which oxygen existing in the reaction system bonds with active carbon to form carbon dioxide, suppresses the reaction between carbon dioxide and active hydrogen.

Preferred examples of a transition metal element forming the transition metal, transition metal powder, and transition metal compound include Ti, V, Cr, Mn, Fe, Co, Ni, Cu, Y, Zr, Nb, Mo, Ru, Rh, Pd, Ag, Ta, W, Pt, and Au. Of these, more preferred examples thereof include Ni, Co, Fe, Cu, Cr, W, Mo, Ti, V, Mn, Ru, Rh, Pd, and Ag. Of those, Fe is the most preferred element from the viewpoint of being inexpensive. However, a temperature at which the catalyst for dehydrating the hydrocarbon activates is 50° C. or higher. Thus, Ni or Co is preferred for causing a dehydration reaction of the hydrocarbon at lower temperatures.

An alloy including an Si element and one or more kinds of the transition metal elements to be used in the present invention is preferably $NiSi_2$, $(Si_2Ni)$, $CoSi_2$, $Cr_3Si_2$, $Cr_3Si$, $TiSi_2$, $Ti_5Si_3$, $NbSi_2$, $MoSi_2$, $WSi_2$, $ZrSi_2$, $VSi_2$, or $HfSi_2$.

The mixture of transition metal powders to be used in the present invention preferably includes Ni, Co, Fe, Cu, Cr, W, Mo, Ti, V, Mn, Ru, Rh, Pd, and Ag.

The particles of the powder mixture preferably have an average particle size of 0.1 μm to 10 μm.

Preferred examples of the transition metal compound to be used in the present invention include a transition metal oxide, a transition metal hydroxide, an organic transition metal compound, a transition metal carbide, a transition metal nitride, and a transition metal salt. Of these, the organic transition metal compound is preferred as a material serving effectively as a catalyst because the organic transition metal compound is liable to disperse uniformly with a powder material containing an Si element in a solvent and is decomposed easily such that the transition metal element is dispersed more uniformly. The transition metal oxide, transition metal hydroxide, and transition metal salt are each presumably reduced by hydrogen generated through a decomposition reaction of the hydrocarbon raw material at high temperature and high pressure and converted into fine transition metal powder, to thereby enhance its effect of accelerating a dehydration reaction as a catalyst.

Preferred examples of the organic transition metal compound include ferrocene, nickelocene, cobaltocene, iron carboxylate, nickel carboxylate, cobalt carboxylate, iron oxalate, nickel oxalate, cobalt oxalate, nickel phthalocyanine, cobalt phthalocyanine, iron phthalocyanine, nickel acetylacetonate, cobalt acetylacetonate, iron acetylacetonate, nickel carbonyl, cobalt carbonyl, iron carbonyl, bis (triphenylphosphine) nickel dicarbonyl, dibromobis (triphenylphosphine) nickel, and chlorotris (triphenylphosphine) rhodium. It should be noted that a hydrocarbon moiety included in the organic transition metal compound is decomposed upon a synthetic reaction. After that, the decomposed moiety may be converted into the portion of a C element, which is served on a non-synthetic reaction of silicon carbide powder.

Preferred examples of the transition metal oxide include one or more kinds of oxides selected from the group consisting of iron oxide, nickel oxide, cobalt oxide, copper oxide, niobium oxide, chromium oxide, tungsten oxide, molybdenum oxide, titanium oxide, ruthenium oxide, rhodium oxide, and palladium oxide.

A ratio of (A) an alloy containing an Si element and one or more kinds of transition metal elements, a mixture of metal silicon powder and transition metal powder, or a mixture of metal silicon powder and a transition metal compound to (B) hydrocarbon in the raw materials to be used for the method of manufacturing silicon carbide of the present invention B/A is 1.0 to 2.0, and desirably 1.1 to 1.5.

A temperature for synthesizing silicon carbide powder in the present invention is preferably 500 to 800° C. in the case where an Fe element is used as a raw material for a catalyst material, and 370 to 800° C. in the case where an Ni or Co element is used for the catalyst material. The synthesis temperature is preferably changed in consideration of an activation temperature of the transition metal element to be used.

In the present invention, silicon carbide powder can be synthesized in a temperature range of 370 to 800° C., but an after-treatment for purification is preferably provided. The silicon carbide powder obtained through the above-mentioned method contains a transition metal as an impurity. Further, the silicon carbide powder may contain unreacted silicon or carbon by-product as an impurity. The transition metal is preferably removed by washing with an acid, such as hydrofluoric acid, hydrochloric acid, or nitric acid. The unreacted carbon, which did not bond with the Si element, can be removed through a thermal treatment in oxygen or air at 700 to 1,000° C. The unreacted silicon, which did not bond with the C element, can be removed through a thermal treatment in oxygen or air and then by washing with hydrofluoric acid or the like.

Figure 1:
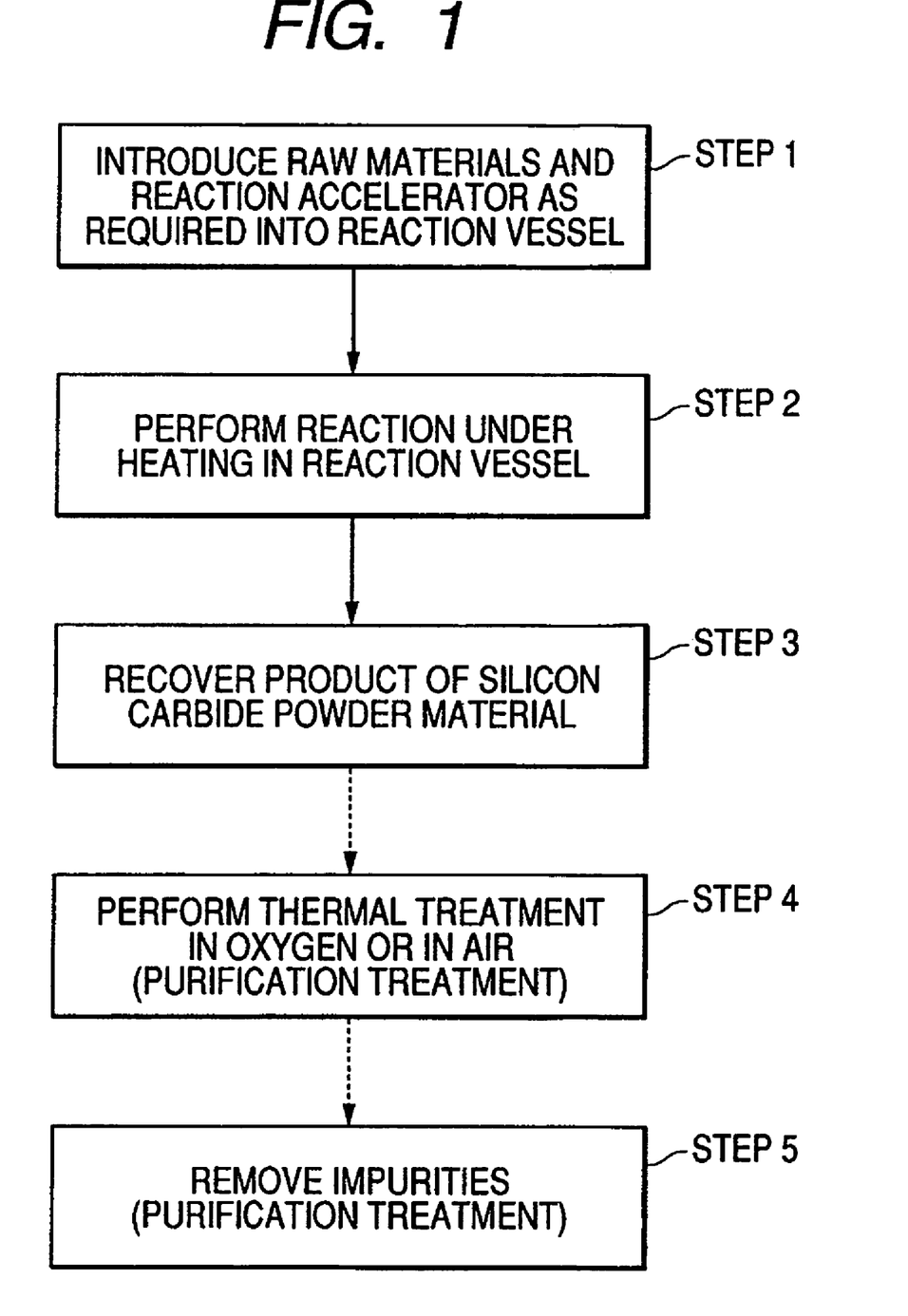
FIG. 1 is a flow chart showing an example of a method of manufacturing silicon carbide according to the present invention.

FIG. 1 is a flow chart showing an example of the manufacturing method according to the present invention as described above. In FIG. 1, Step 1 refers to a preparation step in which raw materials and a medium for dissolving or dispersing the raw materials (introduced as required, hereinafter, referred to as a reaction accelerating medium) are introduced into a reaction vessel. Step 2 refers to a step in which the raw materials and the reaction accelerating medium as required are heated for a reaction of the raw materials for a predetermined period of time. Step 3 refers to a step after Step 2 in which unreacted raw materials are separated to thereby obtain silicon carbide powder. Then, in Step 4, as required, the silicon carbide powder obtained in Step 3 is preferably purified by heating in air or oxygen at 700 to 1,000° C. to remove unreacted carbon and the like. Step 5 refers to a step in which the transition metal, unreacted Si, and the like are removed by washing the silicon carbide powder with an acid, such as hydrofluoric acid, nitric acid, hydrochloric acid, or a mixture thereof. Note that Steps 4 and 5 may be omitted in accordance with the use of the obtained silicon carbide powder.

Figure 2:
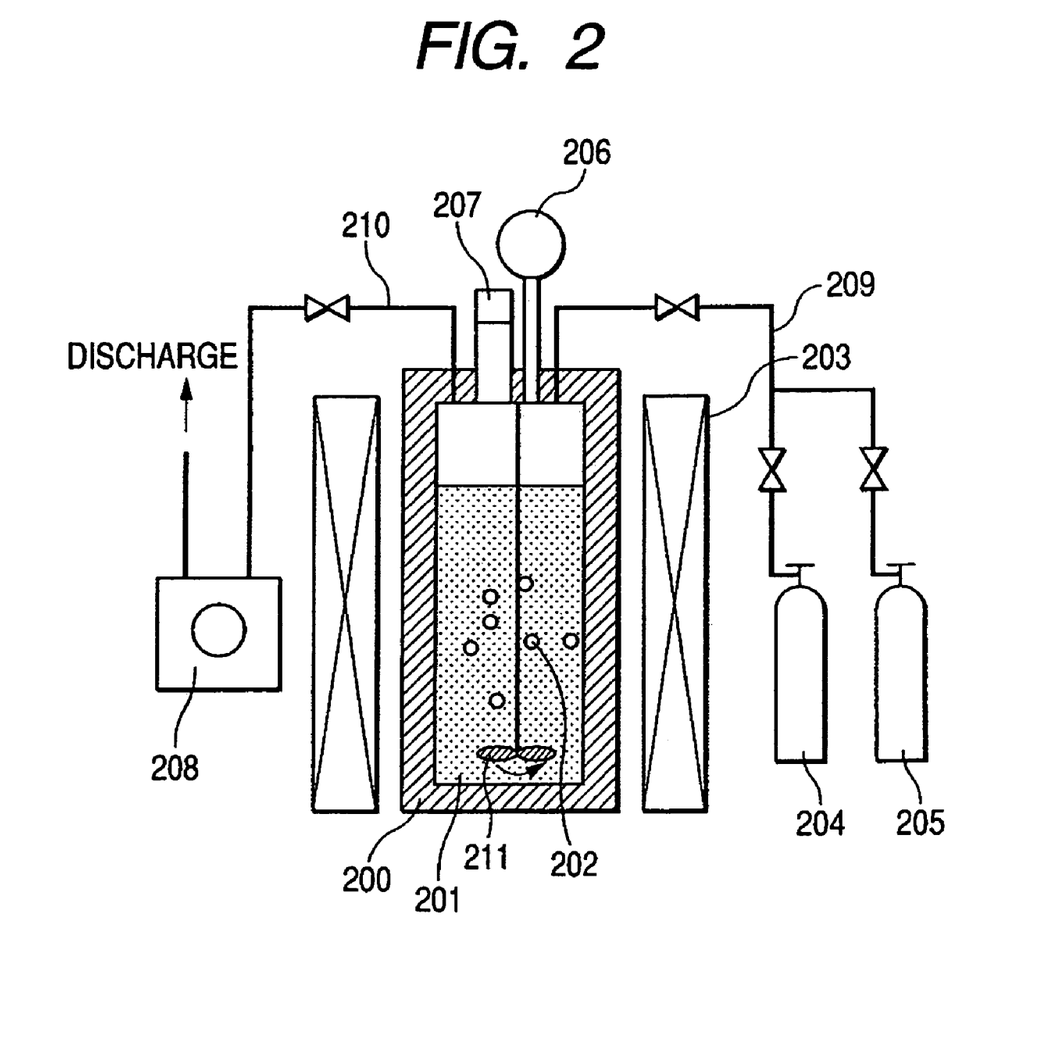
FIG. 2 is a schematic diagram showing an example of a high temperature and high pressure reaction apparatus used for the manufacture of silicon carbide according to the present invention.

An example of a reaction apparatus for preparing silicon carbide powder using the above-mentioned manufacturing method is a reaction vessel 200 provided with a pressure gauge 206, a heating device 203, and a safety valve 207 as shown in FIG. 2. In FIG. 2, reference numeral 201 represents a raw material or a raw material and a reaction accelerating medium, such as carbon dioxide, and reference numeral 202 represents another raw material. Reference numeral 204 represents a raw material storage vessel, and reference numeral 205 represents a storage vessel for a reaction accelerating medium such as carbon dioxide. Reference numeral 208 represents an exhaust device, and reference numeral 209 represents a supply tube for the raw material or reaction accelerating medium. Reference numeral 210 represents an exhaust tube, and reference numeral 211 represents a stirring mechanism.

At least a material for an inner wall of the reaction vessel 200 is preferably formed of stainless steel, and more preferably, an Ni—Cr—Mo alloy from the viewpoint of corrosion resistance. Further, a circulation-type reaction apparatus (not shown), in which a desired reaction product (silicon carbide powder) is separated the unreacted raw materials, and the raw materials are returned to the reaction vessel, is preferably used for increasing the yield from the raw materials.

In the present invention, the inside of the reaction vessel 200 having the raw material 201 or another raw material 202 introduced thereinto is evacuated by the exhaust device 208 for deoxidation. A predetermined amount of the raw material 201 is supplied to the reaction vessel from the raw material storage vessel 204, and a predetermined amount of the reaction accelerating medium, such as carbon dioxide, is supplied as required to from the storage vessel 205 for the reaction accelerating medium. Then, the reaction vessel 200 is heated to a temperature range of 370 to 800° C. by using the heating device 203. The pressure during heating varies depending on the raw material, the reaction accelerating medium, amounts thereof to be introduced, and the like, and is preferably an absolute pressure of 60.0 MPa or less. In the case where a main reaction proceeds sufficiently, the pressure may be adjusted to an atmospheric pressure or less by adjusting the exhaust amount of the exhaust device 208. The functions of the stirring mechanism 211 include mixing the raw material or medium 201 with another raw material 202 or medium uniformly and synthesizing a uniform silicon carbide powder from the raw material.

Figure 3:
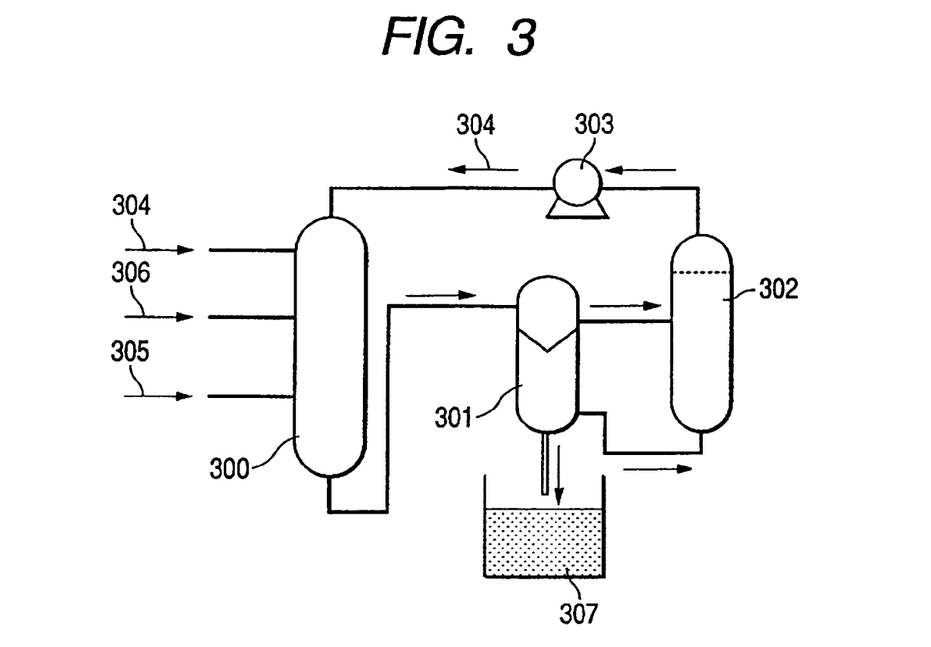
FIG. 3 is a schematic diagram showing an example of a continuous manufacturing apparatus used for the manufacture of silicon carbide according to the present invention.

FIG. 3 is a schematic diagram showing an example of a manufacturing apparatus to be used for continuous manufacturing of silicon carbide powder through the method of the present invention. In FIG. 3, reference numeral 300 represents a reactor, and reference numeral 301 represents a product (produced silicon carbide powder) separator. Reference numeral 302 represents a raw material recovery purification tower, and reference numeral 303 represents a compressor. Reference numeral 304 represents a supplied raw material, and reference numeral 305 represents a supplied catalyst. Reference numeral 306 represents a reaction accelerating medium to be supplied as required, and reference numeral 307 represents silicon carbide powder as a product. First, the raw material 304, another raw material 305, and the reaction accelerating medium 306, such as carbon dioxide, are supplied as required to the reactor 300, which is sufficiently deoxidized, and the reactor 300 is adjusted to a temperature range of 370 to 800° C. The inside of the reactor is preferably adjusted to an absolute pressure of 60.0 MPa or less. However, in the case where the main reaction proceeds sufficiently, the pressure may be adjusted to an atmospheric pressure or less. The reaction is conducted at the above-mentioned temperature and pressure for a predetermined period of time. Then, a mixture of the product and the unreacted raw materials is supplied to the product separator to thereby separate the silicon carbide powder 307 as a product and the unreacted raw material 304. The unreacted raw material is supplied to the raw material recovery purification tower 302, and the recovered unreacted raw material 304 is supplied to the reactor 300 through the compressor 303 as required in the case where the system is at a high pressure. Then, the raw material 304, another raw material 305, and the reaction accelerating medium 306, such as carbon dioxide, are supplied as required for a reaction under predetermined conditions to thereby produce silicon carbide powder.

The silicon carbide powder produced in the present invention can be used as an abrasive, various sintered molded products, and a raw material for a silicon carbide single crystal wafer. Hereinafter, the cases where the silicon carbide powder is used for the above-mentioned applications will be described.

Abrasive

The silicon carbide powder of the present invention can be used as an abrasive for polishing a superhard metal, a soft metal, such as a brass or a copper alloy, a resin, and the like. The silicon carbide powder itself may be used as an abrasive powder. Alternatively, the silicon carbide powder may be used in a form of a paste by kneading with mineral oil or be used as a molded product obtained by solidifying with a resin. A particle size of the abrasive powder may be adjusted through a thermal treatment, and a particle size distribution can be adjusted by screening through a mesh or the like.

Sintered Molded Product

The silicon carbide powder of the present invention may be used by sintering and molding. A surface area of the powder, impurities, sintering aid, granular formation, and the like may affect sintering properties. A smaller particle size of the powder increases a contact area between particles, which is advantageous for sintering. Thus, a sintered product with few defects can be obtained at a low temperature. Silicon carbide of the present invention is synthesized at a low temperature of 800° C. or lower, and thus has a very small primary particle size. To be specific, silicon carbide of the present invention has an average primary particle size of 0.01 μm to 0.1 μm and a BET specific surface area of 10 to 100 m$^2$/g.

The transition metal element and Si, as impurities in the silicon carbide powder, must be removed sufficiently because Si degrades the sintering properties. Thus, in Steps 4 and 5 in FIG. 1, the transition metal element and Si are sufficiently removed. In Step 5 for removing the impurities (purification), the silicon carbide powder is preferably washed with a mixture of hydrofluoric acid and nitric acid.

Examples of the sintering aid include boron, carbon, aluminum, and beryllium oxide. The sintering aid is added in an amount of 1 to 3 wt % and is mixed sufficiently, and the mixture can be heated to about 2,000° C. for sintering. The heating may be performed under normal pressure, but may be performed under a pressure of about 30 to 70 MPa.

In the case where powdery silicon carbide is too fine and is hardly filled into a mold in a molding stage, granules obtained by mixing the silicon carbide powder, the sintering aid, and a binder may be formed and filled thereinto. A spray drier is used as a simple method for granular formation.

Silicon Carbide Single Crystal Wafer

The silicon carbide powder of the present invention can be used as a raw material for a silicon carbide single crystal wafer. In this application, the silicon carbide powder must have small amounts of impurities. Thus, in Steps 4 and 5 in FIG. 1, the silicon carbide powder is preferably subjected to a thermal treatment in oxygen at 700 to 1,000° C. and washed with a mixture of hydrofluoric acid and nitric acid to thereby remove carbon and silicon as by-products, the metal of the catalyst, and other impurities. The thermal treatment is preferably performed under heating because the treatment temperature has a large effect on removal of the impurities. Further, the silicon carbide powder may be subjected to a purification treatment in a stream of a halogen gas, such as HCl and $Cl_2$, at about 1,000° C. as required. Single crystals are produced by introducing the silicon carbide powder of the present invention into a crucible formed of graphite, heating the crucible in a nonoxidative atmosphere at about 2,000° C., and allowing growth of silicon carbide single crystals in a sublimed gas of SiC to be obtained.

Hereinafter, the present invention will be described in more detail based on examples. However, the present invention is not limited to the examples.

Example 1

4.0 g of a silicon nickel alloy $Si_2Ni$ was introduced into a pressure-resistant vessel having an inner volume of 95 ml and formed of hastelloy (Ni—Cr—Mo alloy), and then, 10.0 g of n-hexane was added thereto. 30 g of dry ice was added thereto and the vessel was sealed. A small volume of carbon dioxide gasified at room temperature was exhausted to adjust the pressure inside the vessel, and the mixture was heated at a temperature of 450° C. and an absolute pressure of 28.6 MPa for 2 hours. Then, the mixture was cooled to room temperature and the reaction vessel was opened. A solid content was taken out and dried to thereby recover 5.92 g of powder. For an after treatment, the obtained powder was subjected to a thermal treatment in air at 800° C. for 1 hour. The resultant was introduced into a solution prepared by mixing hydrofluoric acid (50%) and concentrated nitric acid (69%), and the combination was mixed for 1 hour under heating at about 70° C. Then, it was washed with ion-exchanged water, filtered, and dried at 100° C. for 8 hours.

Figure 4:
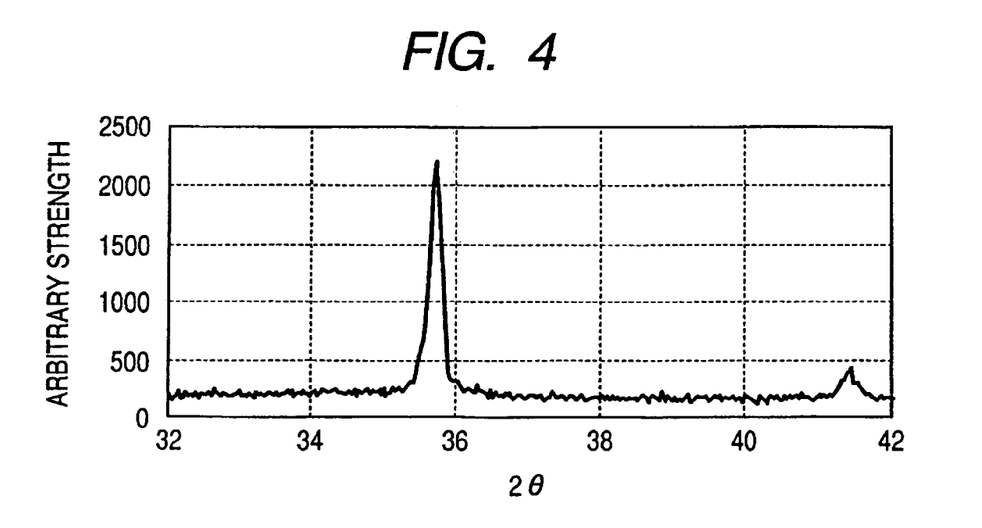
FIG. 4 is a diagram showing an X-ray diffraction pattern of silicon carbide powder produced using a method of manufacturing silicon carbide according to Example 1 of the present invention.

A reaction product obtained through the above-mentioned operation was analyzed by X-ray diffraction to obtain an X-ray diffraction pattern as shown in FIG. 4. The X-ray diffraction measurement was performed by using RINT 2400 (manufactured by Rigaku Corporation) and CuKa rays. A peak in the X-ray diffraction pattern confirmed that the product was β-SiC.

A BET specific surface area of the obtained powder was measured and was a large at 38 m²/g. This powder was observed by using a scanning electron microscope (SEM) and was amorphous and had an average particle size of 0.05 μm or less. For determining amounts of impurities in the obtained silicon carbide powder, amounts of Fe, Ni, Cr, Cu, Mo, Ti, and Al were measured with an inductively coupled plasma spectrometer (JY238U, manufactured by Horiba, Ltd.), resulting in a total amount of those elements of 10 ppm or less. A conversion ratio of an Si element to silicon carbide powder was calculated to be 97.3% from the recovered amounts of the raw materials and the spec and weight of the Si element used, assuming that the silicon carbide powder subjected to after treatment had a purity of 99.99%, indicating that the raw materials reacted efficiently with each other even at low temperatures.

Comparative Example 1

4.0 g of a silicon nickel alloy $Si_2Ni$ was introduced into a pressure-resistant vessel having an inner volume of 95 ml and formed of hastelloy (Ni—Cr—Mo alloy) and then 1.0 g of carbon powder (ketjen black) was added thereto. 30 g of dry ice was added thereto and the vessel was sealed. A small volume of carbon dioxide gasified at room temperature was exhausted to adjust the pressure inside the vessel, and the mixture was heated at a temperature of 450° C. and an absolute pressure of 27.4 MPa for 2 hours. Then, the mixture was cooled to room temperature and the reaction vessel was opened. A solid content was taken out.

A reaction product obtained through the above-mentioned operation was analyzed by X-ray diffraction, with eacch indicated that the raw materials did not react with each other at all.

Example 2

4.0 g of Si powder having an average particle size of 1 μm and 2.0 g of Fe powder having an average particle size of 3 μm were mixed for 30 minutes under stirring in a planetary mill. The mixed powder was taken out and used as a raw material.

After the above raw material was introduced into a pressure-resistant vessel having an inner volume of 95 ml and formed of hastelloy (Ni—Cr—Mo alloy) and then 7.0 g of toluene was added thereto. 30 g of dry ice was added thereto and the vessel was sealed. A small volume of carbon dioxide gasified at room temperature was exhausted to adjust the pressure inside the vessel, and the mixture was heated at a temperature of 700° C. and an absolute pressure of 23.1 MPa for 10 minutes. Then, the mixture was cooled to room temperature and the reaction vessel was opened. A solid content was taken out and dried to thereby recover 6.58 g of powder. For an after treatment, the obtained powder was subjected to a thermal treatment in air at 800° C. for 1 hour. The resultant was introduced into a solution prepared by mixing hydrofluoric acid (50%) and concentrated nitric acid (69%) and mixed for 1 hour under heating at 70° C. Then, the resultant was washed with ion-exchanged water, filtered, and dried at 100° C. for 8 hours.

A reaction product obtained through the above-mentioned operation was subjected to X-ray diffraction analysis to obtain a peak in the X-ray diffraction pattern, which is the same as that in Example 1. A peak in the X-ray diffraction pattern confirmed that the product was β-SiC. A BET specific surface area of the obtained powder was measured and was 31 m²/g. This powder was observed using a scanning electron microscope (SEM) to be amorphous and had an average particle size of 0.05 μm or less. For determining the amounts of impurities in the obtained silicon carbide powder, amounts of Fe, Ni, Cr, Cu, Mo, Ti, and Al were measured using an inductively coupled plasma spectrometer (JY238U, manufactured by Horiba, Ltd.), resulting in a total amount of those elements of 10 ppm or less. A conversion ratio of an Si element used as a raw material to silicon carbide powder was calculated to be 96.7% using the same method as that in Example 1, indicating that the raw materials reacted efficiently with each other.

Comparative Example 2

4.0 g of Si powder was introduced into a pressure-resistant vessel having an inner volume of 95 ml and formed of hastelloy (Ni—Cr—Mo alloy), and then 2.0 g of carbon powder (ketjen black) was added thereto. 30 g of dry ice was added thereto and the vessel was sealed. A small volume of carbon dioxide gasified at room temperature was exhausted to adjust the pressure inside the vessel, and the mixture was heated at a temperature of 700° C. and an absolute pressure of 22.3. MPa for 2 hours. Then, the mixture was cooled to room temperature and the reaction vessel was opened. A solid content was taken out.

A reaction product obtained through the above-mentioned operation was analyzed by X-ray diffraction, which indicated that the raw materials did not react with each other at all.

Example 3

4.0 g of Si powder having an average particle size of 1 μm and 1.0 g of ferrocene dissolved in 7.0 g of toluene were mixed into a paste for 30 minutes under stirring in a planetary mill. The paste was taken out and used as a raw material.

The above-mentioned paste was introduced into a pressure-resistant vessel having an inner volume of 95 ml and formed of hastelloy (Ni—Cr—Mo alloy). 30 g of dry ice was added thereto and the vessel was sealed. A small volume of carbon dioxide gasified at room temperature was exhausted to adjust the pressure inside the vessel, and the mixture was heated at a temperature of 600° C. and an absolute pressure of 25.4 MPa for 10 minutes. Then, the mixture was cooled to room temperature and the reaction vessel was opened. A solid content was taken out and dried to thereby recover 6.24 g of powder. For an after treatment, the obtained powder was subjected to a thermal treatment in air at 800° C. for 1 hour. The resultant was introduced into a solution prepared by mixing hydrofluoric acid (50%) and concentrated nitric acid (69%) and mixed for 1 hour under heating at about 70° C. Then, the resultant was washed with ion-exchanged water, filtered, and dried at 100° C. for 8 hours.

A reaction product obtained through the above-mentioned operation was subjected to X-ray diffraction analysis, and the obtained peak in the X-ray diffraction pattern was the same as that in Example 1. A peak in the X-ray diffraction pattern confirmed that the product was β-SiC. A BET specific surface area of the obtained powder was measured and was 33 m²/g. This powder was observed by using a scanning electron microscope (SEM) to be amorphous and had an average particle size of 0.05 μm or less. For determining the amounts of impurities in the obtained silicon carbide powder, the amounts of Fe, Ni, Cr, Cu, Mo, Ti, and Al were measured with an inductively coupled plasma spectrometer (JY238U, manufactured by Horiba, Ltd.), resulting in a total amount of those elements of 10 ppm or less. A conversion ratio of an Si element used as a raw material to silicon carbide powder using the same method as in Example 1 was calculated to be 98.4%, indicating that the raw materials reacted efficiently with each other.

Comparative Example 3

5.0 g of $SiO_2$ powder having an average particle size of 50 nm and 2.5 g of carbon powder (pitch coke powder) having an average particle size of 10 μm were mixed for 30 minutes under stirring in a planetary mill. This was taken out and used as a raw material.

The above raw material was inserted into a crucible formed of graphite in which the Ar atmosphere was heated at a temperature of 1,700° C. under an absolute pressure of 0.1 MPa for 2 hours. Then, the mixture was cooled to room temperature and the solid content was taken out from the crucible to thereby recover 3.70 g of powder. For an after treatment, the obtained powder was subjected to a thermal treatment in air at 800° C. for 1 hour. The resultant was introduced into a solution prepared by mixing hydrofluoric acid (50%) and concentrated nitric acid (69%) and mixed for 1 hour under heating at 70° C. Then, the resultant was washed with ion-exchanged water, filtered, and dried at 100° C. for 8 hours.

A reaction product obtained through the above-mentioned operation was subjected to X-ray diffraction analysis, and a peak obtained in the X-ray diffraction pattern was the same as that in Example 1. A peak in the X-ray diffraction pattern confirmed that the product was β-SiC. A BET specific surface area of the obtained powder was measured and was $0.07 \, m^2/g$. This powder was observed by using a scanning electron microscope (SEM) to be amorphous and had an average particle size of between 5 to 10 μm. For determining the amounts of impurities in the obtained silicon carbide powder, the amounts of Fe, Ni, Cr, Cu, Mo, Ti, and Al were measured with an inductively coupled plasma spectrometer (JY238U, manufactured by Horiba, Ltd.), resulting in an amount of an Al element being seven times larger than that obtained in Example 1 and a total amount of those elements measured being 10 times larger than that obtained in Example 1. A conversion ratio of an Si element to silicon carbide powder was calculated to be 83.6% using the same method as in Example 1, indicating that much of the raw materials were unreacted.

Example 4

4.0 g of Si powder having an average particle size of 1 μm and 2.0 g of $Fe_3O_4$ powder having an average particle size of 0.05 μm were mixed for 30 minutes under stirring in a planetary mill. The mixed powder was taken out and used as a raw material.

The above raw material was introduced into a pressure-resistant vessel having an inner volume of 95 ml and formed of hastelloy (Ni—Cr—Mo alloy) and then 7.0 g of n-hexane was added thereto. 30 g of dry ice was added thereto and the vessel was sealed. A small volume of carbon dioxide gasified at room temperature was exhausted to adjust the pressure inside the vessel, and the mixture was heated at a temperature of 700° C. and an absolute pressure of 27.2 MPa for 10 minutes. Then, the mixture was cooled to room temperature, and the reaction vessel was opened. A solid content was taken out and dried to thereby recover 5.92 g of powder. For an after treatment, the obtained powder was subjected to a thermal treatment in air at 800° C. for 1 hour. The resultant was introduced into a solution prepared by mixing hydrofluoric acid (50%) and concentrated nitric acid (69%) and mixed for 1 hour under heating at 70° C. Then, the resultant was washed with ion-exchanged water, filtered, and dried at 100° C. for 8 hours.

A reaction product obtained through the above-mentioned operation was subjected to X-ray diffraction analysis, and a peak obtained in the X-ray diffraction pattern was the same as that in Example 1. The peak in the X-ray diffraction pattern confirmed that the product was β-SiC. A BET specific surface area of the obtained powder was measured and was $30 \, m^2/g$. This powder was observed by using a scanning electron microscope (SEM) to be amorphous and had an average particle size of 0.05 μm or less. For determining the amounts of impurities in the obtained silicon carbide powder, the amounts of Fe, Ni, Cr, Cu, Mo, Ti, and Al were measured with an inductively coupled plasma spectrometer (JY238U, manufactured by Horiba, Ltd.), resulting in a total amount of those elements of 10 ppm or less. A conversion ratio of an Si element to silicon carbide powder was calculated to be 95.8% with the same method as in Example 1, indicating that the raw materials reacted efficiently with each other.

Example 5

4.0 of Si powder having an average particle size of 1 μm and 1.0 g of ferrocene dissolved in 7.0 g of toluene were mixed into a paste for 30 minutes under stirring in a planetary mill. Then, this paste was taken out and dried in an $N_2$ atmosphere to thereby prepare a mixture of Si and ferrocene.

The above-mentioned paste was introduced into a pressure-resistant vessel having an inner volume of 95 ml and formed of hastelloy (Ni—Cr—Mo alloy) and was degassed. Then, the paste was cooled with liquid nitrogen and 7.0 g of propylene was added thereto. The mixture was returned to room temperature and then was heated at a temperature of 600° C. and an absolute pressure of 23.6 MPa for 10 minutes. Then, the mixture was cooled to room temperature, and the reaction vessel was opened. A solid content was taken out and dried to thereby recover 6.35 g of powder. For an after treatment, the obtained powder was subjected to a thermal treatment in air at 800° C. for 1 hour. The resultant was introduced into a solution prepared by mixing hydrofluoric acid (50%) and concentrated nitric acid (69%) and mixed for 1 hour under heating at 70° C. Then, the resultant was washed with ion-exchanged water, filtered, and dried at 100° C. for 8 hours.

A reaction product obtained through the above-mentioned operation was subjected to X-ray diffraction analysis, and a peak obtained in the X-ray diffraction pattern was the same as that in Example 1. The peak in the X-ray diffraction pattern confirmed that the product was β-SiC. A BET specific surface area of the obtained powder was measured and was $33 \, m^2/g$. This powder was observed by using a scanning electron microscope (SEM) to be amorphous and had an average particle size of 0.05 μm or less. For determining the amounts of impurities in the obtained silicon carbide powder, the amounts of Fe, Ni, Cr, Cu, Mo, Ti, and Al were measured with an inductively coupled plasma spectrometer (JY238U, manufactured by Horiba, Ltd.), resulting in a total amount of those elements of 10 ppm or less. A conversion ratio of an Si element to silicon carbide powder was calculated to be 98.9% with the same method as in Example 1, indicating that the raw materials reacted efficiently with each other.

Table 1 shows collectively the results of Examples and Comparative Examples.

TABLE 1

| | Synthesis temperature (°C.) | Synthesis pressure (MPa) | After treatment | | XRD | Note 1) Conversion ratio of raw material to SiC (%) | Note 2) BET specific surface area (m²/g) |
|---|---|---|---|---|---|---|---|
| | | | Baking in air at 800° C. | Treatment with mixed acid of hydrofluoric acid and nitric acid | | | |
| Example 1 | 450 | 28.6 | Performed | | β-SiC | 97.3 | 38 |
| Example 2 | 700 | 23.1 | Performed | | β-SiC | 96.7 | 31 |
| Example 3 | 600 | 25.4 | Performed | | β-SiC | 98.4 | 33 |
| Example 4 | 700 | 27.2 | Performed | | β-SiC | 95.8 | 30 |
| Example 5 | 600 | 23.6 | Performed | | β-SiC | 98.9 | 33 |
| Comparative example 1 | 450 | 27.4 | Not performed | | No peak of β-SiC | 0.0 | — |
| Comparative example 2 | 700 | 22.3 | Not performed | | No peak of β-SiC | 0.0 | — |
| Comparative example 3 | 1,700 in Ar | 0.1 | Performed | | β-SiC | 83.6 | 0.07 |

Note 1—Conversion ratio (%) from an Si raw material to SiC was calculated by using the following equation assuming that silicon carbide subjected to an after treatment had a purity of 99.99%:

Conversion ratio (%)={[(Weight of Si element in silicon carbide subjected to after treatment)×0.9999]/(Weight of Si element in raw material)}×100

Note 2—BET specific surface area refers to specific surface area of silicon carbide powder subjected to an after treatment measured using a Brunauer-Emmett-Teller method.

Table 1 indicates that in the method of manufacturing silicon carbide according to the present invention, the hydrocarbon and the Si element react efficiently with each other even at a low temperature, and the silicon carbide powder obtained using this method has a large specific surface area.

The method of manufacturing silicon carbide according to the present invention can be used for manufacturing silicon carbide powder that can be used as an abrasive, a structural ceramic material, raw materials for various sintered molded products, and a raw material for a silicon carbide single crystal wafer.

According to a preferred embodiment of the present invention, powdery silicon carbide (hereinafter, referred to as silicon carbide powder), which can be used not only as an abrasive, but also as a structural ceramic material, a raw material for various sintered molded products, and a raw material for a silicon carbide single crystal wafer, can be produced at a low cost by synthesizing silicon carbide at a low temperature.

According to another preferred embodiment of the present invention, a silicon carbide synthesis reaction can be performed at a low temperature of 370 to 800° C. to thereby reduce processing energy cost.

In the present invention, silicon carbide is synthesized at a low temperature to thereby allow production of silicon carbide powder having a small particle size. The silicon carbide powder having a small particle size has good sintering properties and is suitable for manufacturing a silicon carbide sintered molded product.

According to still another preferred embodiment of the present invention, a silicon carbide powder material, which can be used as a raw material for a silicon carbide single crystal wafer, can be supplied by providing a simple purification step because the hydrocarbon raw material containing small amounts of impurity elements is used, no particular impurity metal elements except the transition metal for accelerating a dehydrogenation reaction of the hydrocarbon raw material and the metal element of the catalyst are mixed, the conversion ratio from the raw material Si element to silicon carbide is high, and the amount of unreacted silicon is small.

This application claims priority from Japanese Patent Application No. 2005-021614, filed on Jan. 28, 2005, which is hereby incorporated by reference herein.

What is claimed is:

1. A method of manufacturing powdery silicon carbide comprising reacting, in a temperature range of 370 to 800° C. and an absolute pressure of 0.3 to 60.0 MPa, an alloy containing at least an Si element and at least one transition metal element with at least one substituted or unsubstituted hydrocarbon selected from the group consisting of a chain saturated hydrocarbon, a chain unsaturated hydrocarbon, a cyclic saturated hydrocarbon, an alcohol, and an aromatic hydrocarbon, wherein the at least one substituted or unsubstituted hydrocarbon is converted into a supercritical fluid or a subcritical fluid in the temperature range of 370 to 800° C. and the absolute pressure of 0.3 to 60 MPa.

2. The method of manufacturing powdery silicon carbide according to claim 1, wherein the transition metal element comprises at least one element selected from the group consisting of iron, cobalt, nickel, copper, silver, tantalum, niobium, chromium, tungsten, molybdenum, titanium, ruthenium, rhodium, and palladium.

3. A method of manufacturing powdery silicon carbide comprising reacting, in a temperature range of 370 to 800° C. and an absolute pressure of 0.3 to 60.0 MPa, a mixture containing at least a metal silicon powder and a transition metal powder with at least one substituted or unsubstituted hydrocarbon selected from the group consisting of a chain saturated hydrocarbon, a chain unsaturated hydrocarbon, a cyclic saturated hydrocarbon, an alcohol, and an aromatic hydrocarbon, wherein the at least one substituted or unsubstituted hydrocarbon is converted into a supercritical fluid or a subcritical fluid in the temperature range of 370 to 800° C. and the absolute pressure of 0.3 to 60 MPa.

4. The method of manufacturing powdery silicon carbide according to claim 3, wherein a main element constituting the transition metal powder comprises at least one element selected from the group consisting of iron, cobalt, nickel, copper, silver, tantalum, niobium, chromium, tungsten, molybdenum, titanium, ruthenium, rhodium, and palladium.

5. A method of manufacturing powdery silicon carbide comprising reacting, in a temperature range of 370 to 800° C. and an absolute pressure of 0.3 to 60.0 MPa, a mixture containing a metal silicon powder and a transition metal compound with at least one substituted or unsubstituted hydrocarbon selected from the group consisting of a chain saturated hydrocarbon, a chain unsaturated hydrocarbon, a cyclic saturated hydrocarbon, an alcohol, and an aromatic hydrocarbon, wherein the at least one substituted or unsubstituted hydrocarbon is converted into a supercritical fluid or a subcritical fluid in the temperature range of 370 to 800° C. and the absolute pressure of 0.3 to 60 MPa.

6. The method of manufacturing powdery silicon carbide according to claim 5, wherein a main transition metal element constituting the transition metal compound comprises at least one element selected from the group consisting of iron, cobalt, nickel, copper, silver, tantalum, niobium, chromium, tungsten, molybdenum, titanium, ruthenium, rhodium, and palladium.

7. The method of manufacturing powdery silicon carbide according to claim 5, wherein the transition metal compound comprises an organic transition metal compound.

8. The method of manufacturing powdery silicon carbide according to claim 5, wherein the organic transition metal compound comprises at least one compound selected from the group consisting of ferrocene, nickelocene, cobaltocene, iron carboxylate, nickel carboxylate, cobalt carboxylate, iron oxalate, nickel oxalate, cobalt oxalate, nickel phthalocyanine, cobalt phthalocyanine, iron phthalocyanine, nickel acetylacetonate, cobalt acetylacetonate, iron acetylacetonate, nickel carbonyl, cobalt carbonyl, and iron carbonyl.

9. The method of manufacturing powdery silicon carbide according to claim 5, wherein the transition metal compound comprises a transition metal oxide.

10. The method of manufacturing powdery silicon carbide according to claim 9, wherein the transition metal oxide comprises at least one oxide selected from the group consisting of iron oxide, nickel oxide, cobalt oxide, copper oxide, niobium oxide, chromium oxide, tungsten oxide, molybdenum oxide, titanium oxide, ruthenium oxide, rhodium oxide, and palladium oxide.

11. The method of manufacturing powdery silicon carbide according to claim 5, wherein the transition metal compound comprises a transition metal salt.

12. The method of manufacturing powdery silicon carbide according to claim 1, wherein the alloy is at least one selected from the group consisting of $NiSi_2$, $Si_2Ni$, $CoSi_2$, $Cr_3Si_2$, $Cr_3Si$, $TiSi_2$, $Ti_5Si_3$, $NbSi_2$, $MoSi_2$, $WSi_2$, $ZrSi_2$, $VSi_2$ and $HfSi_2$.

13. The method of manufacturing powdery silicon carbide according to claim 1, wherein the absolute pressure is 2 to 30 MPa.

14. The method of manufacturing powdery silicon carbide according to claim 3, wherein the absolute pressure is 2 to 30 MPa.

15. The method of manufacturing powdery silicon carbide according to claim 7, wherein the absolute pressure is 2 to 30 MPa.

* * * * *